United States Patent
Nagasugi et al.

(10) Patent No.: US 7,008,343 B2
(45) Date of Patent: Mar. 7, 2006

(54) RADIAL TYPE PISTON MOTOR WITH SPEED REDUCER

(75) Inventors: Akinori Nagasugi, Minamikawachi-machi (JP); Takahiro Miyata, Oyama (JP); Yoshiyuki Unno, Oyama (JP); Hiroshi Endo, Kokubunji-machi (JP)

(73) Assignee: Komatsu Ltd., Tokyo (JP)

( * ) Notice: Subject to any disclaimer, the term of this patent is extended or adjusted under 35 U.S.C. 154(b) by 85 days.

(21) Appl. No.: 10/762,875

(22) Filed: Jan. 21, 2004

(65) Prior Publication Data

US 2004/0152552 A1    Aug. 5, 2004

(30) Foreign Application Priority Data

Jan. 30, 2003    (JP) .............................. 2003-022313

(51) Int. Cl.
 *F16J 47/04*    (2006.01)
 *F16H 37/02*    (2006.01)
(52) U.S. Cl. ........................................ 475/83; 475/219
(58) Field of Classification Search ................ 475/337, 475/286, 83, 219; 180/371–2
See application file for complete search history.

(56) References Cited

U.S. PATENT DOCUMENTS

| 4,020,716 A | * | 5/1977 | Toth et al. ................... 180/372 |
| 4,583,425 A | * | 4/1986 | Mann et al. ................... 475/83 |
| 5,397,281 A | * | 3/1995 | Forster ......................... 475/83 |
| 6,102,824 A | * | 8/2000 | Kosodo et al. ............... 475/83 |
| 6,186,262 B1 | * | 2/2001 | Mann et al. ................. 475/900 |
| 6,524,206 B1 | * | 2/2003 | Tsunemi et al. .............. 475/83 |
| 2001/0021681 A1 | * | 9/2001 | Fukuda ........................ 475/83 |
| 2001/0035012 A1 | * | 11/2001 | Smith ........................... 475/83 |

FOREIGN PATENT DOCUMENTS

JP    42-24608    11/1967
JP    50-14696    5/1975

* cited by examiner

*Primary Examiner*—Roger Pang
(74) *Attorney, Agent, or Firm*—Frishauf, Holtz, Goodman & Chick, P.C.

(57) ABSTRACT

A radial type piston motor with a speed reducer capable of housing the speed reducer and the motor within width of a track shoe. For this purpose, in the radial type piston motor with a speed reducer: the speed reducer includes planetary gear trains of a plurality of stages; a hollow final shaft is integrally constructed in a motor case of the motor; at least a planetary gear train of one stage of the aforesaid planetary gear trains is placed in a hollow of the final shaft; and at least a final stage planetary gear train of the plurality of planetary gear trains is placed outside the final shaft.

7 Claims, 5 Drawing Sheets

F I G. 1
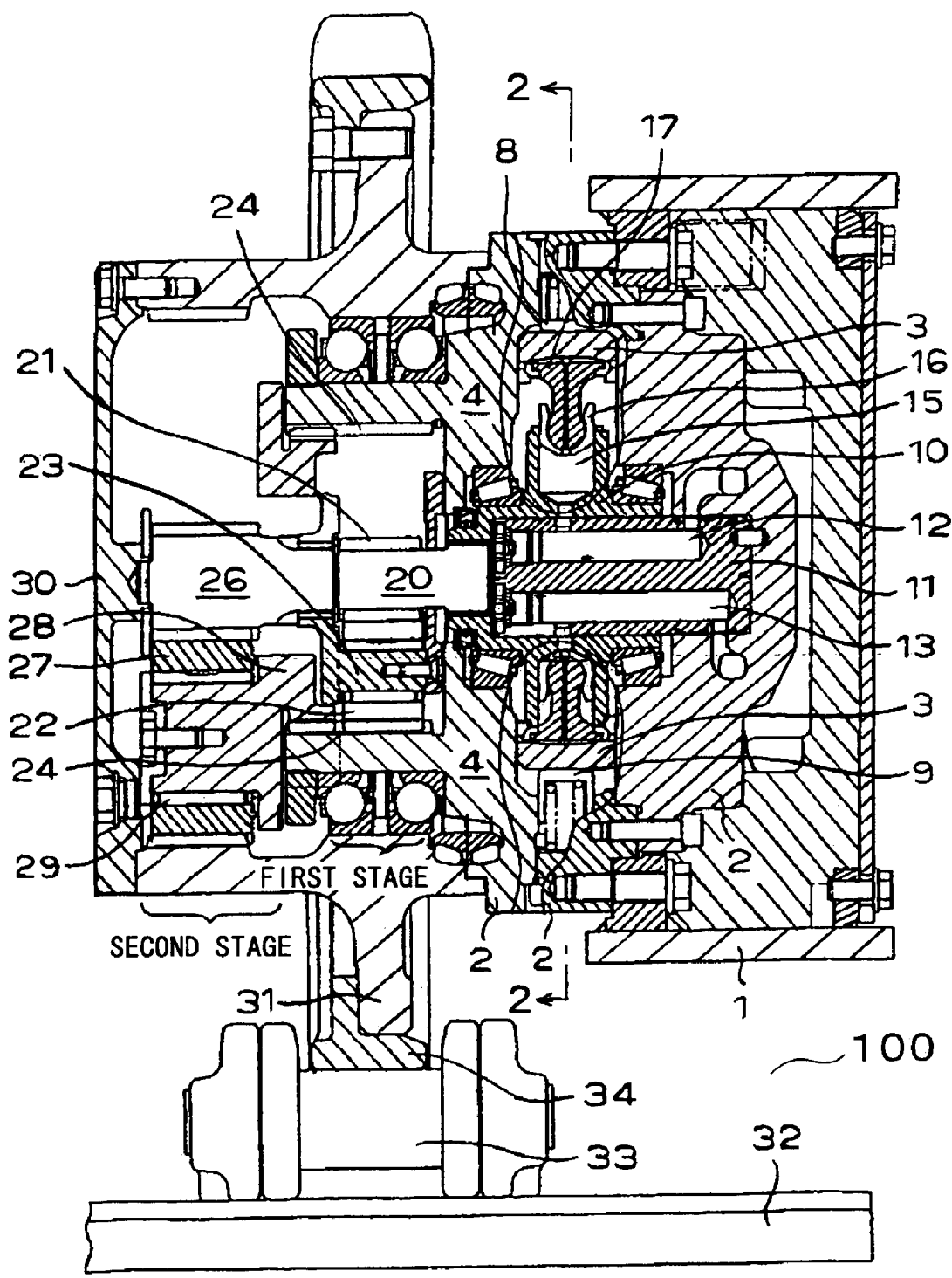

RADIAL TYPE PISTON MOTOR WITH SPEED REDUCER

TECHNICAL FIELD

The present invention relates to a radial type piston motor with a speed reducer.

BACKGROUND ART

A constitution in which a planetary gear speed reducer is mounted to an axial type motor and a radial type motor to obtain large torque at low speed is conventionally known, and a motor with a speed reducer in which a motor and a planetary speed reducer are combined is known (for example, refer to the last line of left column on page 1 to line 5 from the bottom of right column on page 1, and FIG. 1 and FIG. 2 of Japanese Patent Publication No. 42-24608, and line eight from the bottom of left column on page 1 to line 8 of left column on page 2, and FIG. 1 to FIG. 3 of Japanese Patent Publication No. 50-14696). A motor with a planetary gear speed reducer with combination of an axial type motor and planetary gear trains of two stages, and the like are used.

Since the basic constitutions of the motors with the speed reducers described in the above-described both Patent Publications are the same, the constitution described in Japanese Patent Publication No. 42-24608 will be explained with use of FIGS. 3 and 4. A plunger 43 sliding in a radial direction inside a cylinder block 42 is pressed by pressure oil supplied from an inlet and discharge port 41 provided at a housing 40. In this situation, an inner circumference surface of a rotary block 46 supported at an eccentric cam 44 with a bearing 45 is pressed by the plunger 43 to rotate the rotary block 46.

A pinion 47 with teeth being cut is formed on an outer circumference surface of the rotary block 46. The pinion 47 is meshed with an internal gear 48 formed integrally with the housing 40, and rotation with a center $O_2$ as a center of rotation of the eccentric cam 44 is restrained, and by this restraint, the rotary block 46 revolves. Since a pintle 49 rotates integrally with the eccentric cam 44, pressure oil can be fed to each cylinder alternately corresponding to the rotation of the eccentric cam 44 and the inner circumference surface of the rotary block 46 is pressed via the plunger 43 to revolve the rotary block 46.

From the relationship of a number of teeth $Z_1$, of the pinion 47 and a number of teeth $Z_2$ of the internal gear 48, the rotary block 46 rotates on its own axis by $(Z_2-Z_1)/Z_1$ with respect to one revolution. From this, rotation of the rotary block 46 can be reduced at a ratio of $(Z_2-Z_1)/Z_1$, and the reduced rotation can be taken out from an output shaft 51 via a rotation driving pin 50. The output power of the motor with the speed reducer can be taken out as rotation of the output shaft 51 by decelerating the rotation of the motor by the pinion 47 and the internal gear 48. However, a planetary gear train of one stage is used for decelerating the motor rotation, and the number of teeth of the number of teeth $Z_1$ of the pinion 47 and the number of teeth $Z_2$ of the internal gear 48 is made small, whereby a large speed reduction ratio is obtained.

Consequently, when large torque at low speed is to be obtained, a load applied between the pinion 47 and the internal gear 48 becomes large, and breakage occurs to the pin 50 and the like, which causes the situation in which the rotation of the motor cannot be taken out. Consequently, as the torque which can be taken out with the output shaft 51, large torque cannot be taken out, and the torque which can be outputted is naturally limited. The output power is taken out as the shaft rotation of the output shaft 51, and for example, in traveling equipment including a track shoe of an endless track, the output power cannot be taken out in a state of case rotation as an output power to a traveling drive sprocket for driving the track shoe.

In order to take out rotation in the state of the case rotation, a gear mechanism for further making case rotation is required, and especially in order to drive a traveling track shoe with the traveling drive sprocket, output of large torque is demanded. Namely, in order to output large torque, it is necessary to increase the motor in size. Due to this, the upsized motor and the speed reducer cannot be placed within the width of the track shoe, or within the rotation surface of the traveling drive sprocket.

FIG. 5 shows a prior art example of a motor with a speed reducer in which planetary gear trains of two stages are combined with the axial type motor. High pressure oil discharged from an external hydraulic pump (not shown) is introduced into a plurality of cylinders 60 to reciprocate a piston 61 in each cylinder 60. As a result, the piston 61 slides while pressing a swash plate 63 with a piston shoe 62 rotatably provided at a tip end of the piston 61, and rotationally drives a motor shaft 64-1 which is spline-connected to the cylinder 60. Further, this rotationally drives the rotary shaft (sun shaft) 64-2 which is spline-connected to the motor shaft 64-1.

The rotary shaft 64-2 is a first sun gear 65 in a first stage planetary gear train. A plurality of first planetary gears 66 rotatably supported at a first carrier 67 are meshed with the first sun gear 65, and also meshed with a first internal gear 68 formed at a traveling sprocket 75. The first carrier 67 and a second sun gear 70 located outside the rotary shaft 64-2 are spline-connected, and rotation around the rotary shaft 64-2 in the first carrier 67 is transmitted to the second sun gear 70. The second sun gear 70 is a sun gear in a second stage planetary gear train.

A plurality of second planetary gears 71 rotatably supported at a second carrier 72 are meshed with the second sun gear 70, and also meshed with a second internal gear 73 formed at the traveling drive sprocket 75. The second carrier 72 is fixed to a motor case 76 of the axial type motor, and the rotation of the second carrier 72 is hindered. The rotation which is outputted from the axial type motor is taken out by the rotary shaft 64-2. The rotation of the rotary shaft 64-2 is decelerated by the first stage planetary gear train with the rotary shaft 64-2 as the first sun gear 70. Since the traveling sprocket 75 is meshed with a track shoe 77, a heavy load is applied at the time of start, and the first internal gear 68 is in a stopped state.

Consequently, the first planetary gear 66 revolves while rotating on its own axis along the first internal gear 68. The revolution of the first planetary gear 68 is taken out as the rotation of the first carrier 67. The rotation of the first carrier 67 is transmitted to the second sun gear 70. As a result, the rotation which is outputted from the rotary shaft 64-2 is decelerated by the first stage planetary gear train, and is transmitted to the second sun gear 70 of the second stage planetary gear train.

The rotation of the second sun gear 70 rotates the second planetary gears 71 on its own axis. Since the second carrier 72 supporting the plurality of second planetary gears 71 is fixed to the motor case 76 of the axial type motor, the second planetary gears 71 do not revolve, but only rotate on their axes. By the rotation of the second planetary gears 71, the second internal gear 73 formed at the traveling drive sprocket 75 rotates, and drives the track shoe 77 which is meshed with the traveling drive sprocket 75. As a result, the rotation outputted from the rotary shaft 64-2 is decelerated by the first stage planetary gear train, and after it is further decelerated by the second stage planetary gear train, it drives the traveling drive sprocket 75. After the traveling sprocket 75 is driven, the first internal gear 68 integrated with the second internal gear 73 also rotates in a rotating direction of the traveling drive sprocket 75.

However, the axial type motor with the speed reducer with the above-described constitution is long in the length in an axial direction. In addition, in the axial type motor, the speed reduction ratio in the first stage planetary gear train generally has to be made large to perform high-speed rotation, and therefore there arises the problem that the placement constitution of the planetary gear train is limited.

SUMMARY OF THE INVENTION

The present invention is made to solve the problems of the above prior arts, and its object is to provide a radial type piston motor with a speed reducer capable of reducing entire length to be compact, and especially capable of housing the speed reducer and the motor within width of a track shoe.

A radial type piston motor with a speed reducer according to the present invention is constituted such that: the speed reducer includes planetary gear trains of a plurality of stages; a hollow final shaft is integrally constructed in a motor case of the motor; and at least a planetary gear train of one stage of the planetary gear trains is placed in a hollow of the final shaft; and at least a final planetary gear train of the plurality of planetary gear trains is placed outside the final shaft.

According to the above constitution, the final shaft which supports the rotary member rotationally driven by the output power from the motor with the speed reducer is constructed integrally with the motor case, the gear train of the planetary speed reducer is constructed in the final shaft, and at least the final stage planetary gear train is placed outside the final shaft. As a result, the entire length of the radial type piston motor with the speed reducer can be shortened.

In addition, as compared with an axial type motor, the radial type piston motor can take a larger capacity of the motor in the same space area, and therefore it is effectively utilized that the speed reduction ratio in the first stage planetary gear train can be made smaller in the radial type piston motor than in the axial type motor. Consequently, since in the present invention, the radial type piston motor is used as the motor, and the placement relationship of the planetary gear trains of the plurality of stages, which constitute the speed reducer, and the final shaft is constituted as described above, the radial type piston motor with the speed reducer can be constituted to be compact.

Further, when the radial type piston motor with the speed reducer of the present invention is used as the driving source of the traveling drive sprocket of the track shoe, it can be easily constituted to house the radial type piston motor with the speed reducer within the track shoe.

In the radial type piston motor with the speed reducer, a carrier in the final stage planetary gear train may be fixed to the final shaft. According to this constitution, the carrier is fixed as the gear with the rotation being fixed among the gears constituting the final stage planetary gear train. In addition, by adopting the constitution in which the carrier is fixed to the final shaft, the constitution of the planetary speed reducer can be made compact and the entire length of the radial type piston motor with the speed reducer can be shortened.

In the radial type piston motor with the speed reducer, an inner circumference surface of the hollow of the final shaft may be formed as an internal gear of the planetary gear train placed in the hollow of the final shaft. According to this constitution, the final shaft is made to support the rotary member rotationally driven by the radial type piston motor with the speed reducer, and is used as the internal gear of the planetary gear train placed in the final shaft. Due to this, the constitution of the planetary speed reducer is made more compact, and the entire length of the radial type piston motor with the speed reducer can be shortened.

In the radial type piston motor with the speed reducer, an inner circumference surface of a traveling drive sprocket of traveling equipment, which is rotatably supported at the final shaft, may be formed as an internal gear in the final stage planetary gear train. According to this constitution, the traveling drive sprocket is used as the rotary member rotatably supported at the final shaft, and the traveling drive sprocket is made the internal gear in the final stage planetary gear train. As a result, the case rotation of the traveling drive sprocket can be performed. The traveling drive sprocket and the radial type piston motor with the speed reducer can be housed within the width of the shoe of the track shoe actuated by the traveling drive sprocket, and in addition, the capacity of the radial type piston motor which can be housed therein can be made larger.

BRIEF DESCRIPTION OF THE DRAWINGS

FIG. 1 is a sectional view of a radial type piston motor with a speed reducer according to an embodiment of the present invention;

BEST MODE FOR CARRYING OUT THE INVENTION

A preferred embodiment of the present invention will be explained in concrete hereinafter based on the attached drawings. The present invention can be effectively applied in, for example, a radial type piston motor with a speed reducer, as a constitution in which a motor capacity can be made larger in the same space area and entire length of the radial type piston motor with the speed reducer can be shortened.

Figure 2:
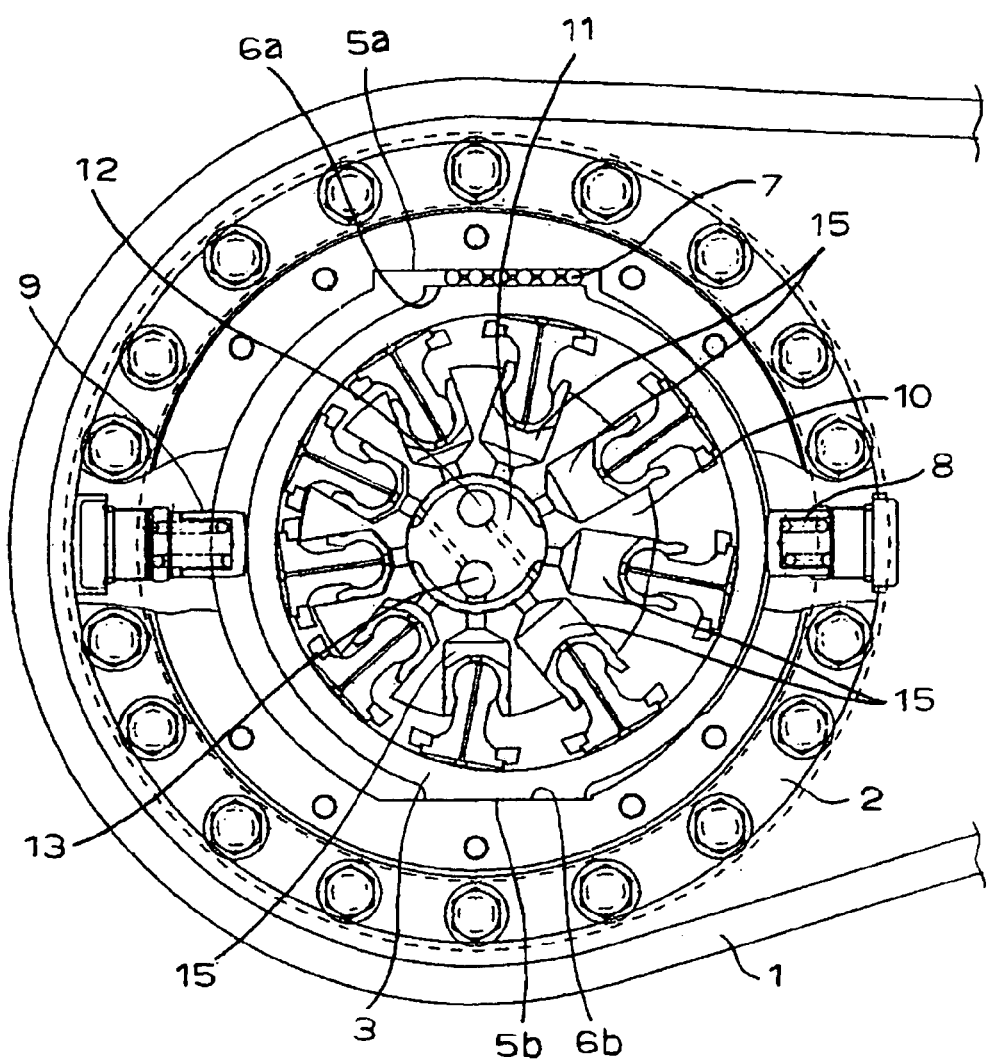
FIG. 2 is a sectional view taken along the line 2—2 in FIG. 1.
Figure 3:
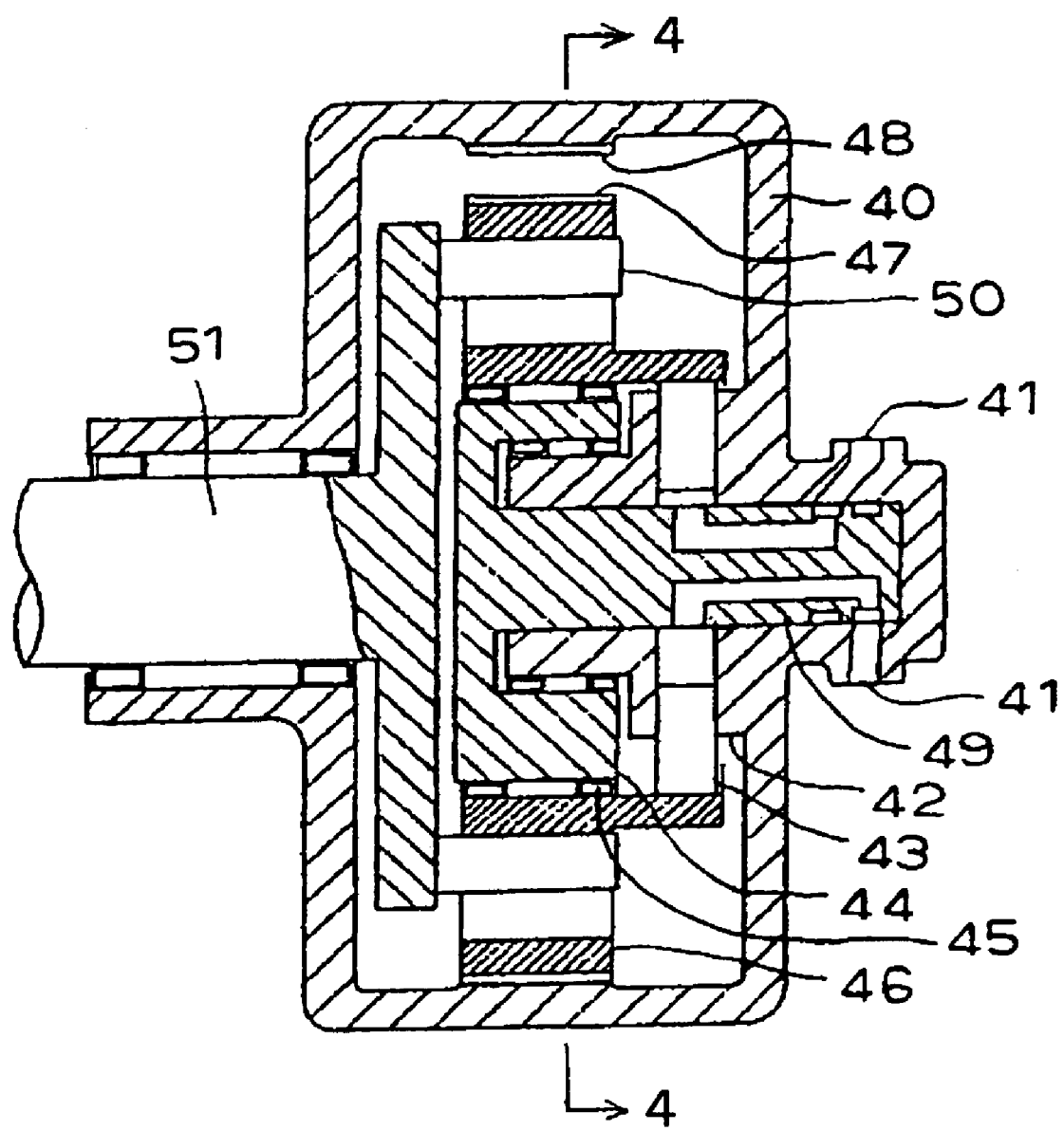
FIG. 3 is a longitudinally sectional view of the radial motor with a speed reducer in a prior art.
Figure 4:
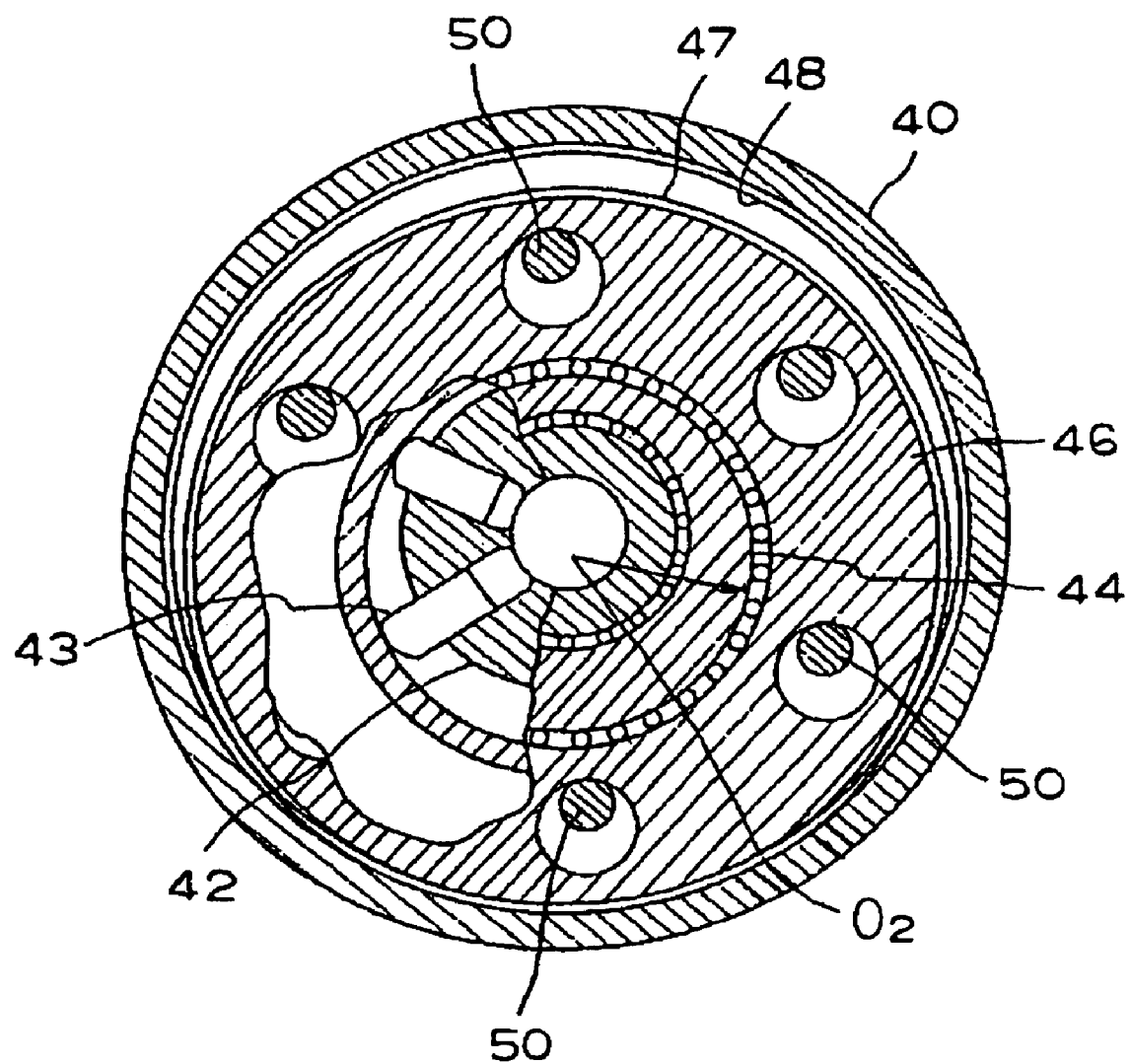
FIG. 4 is a sectional view taken along the line 4—4 in FIG. 3.
Figure 5:
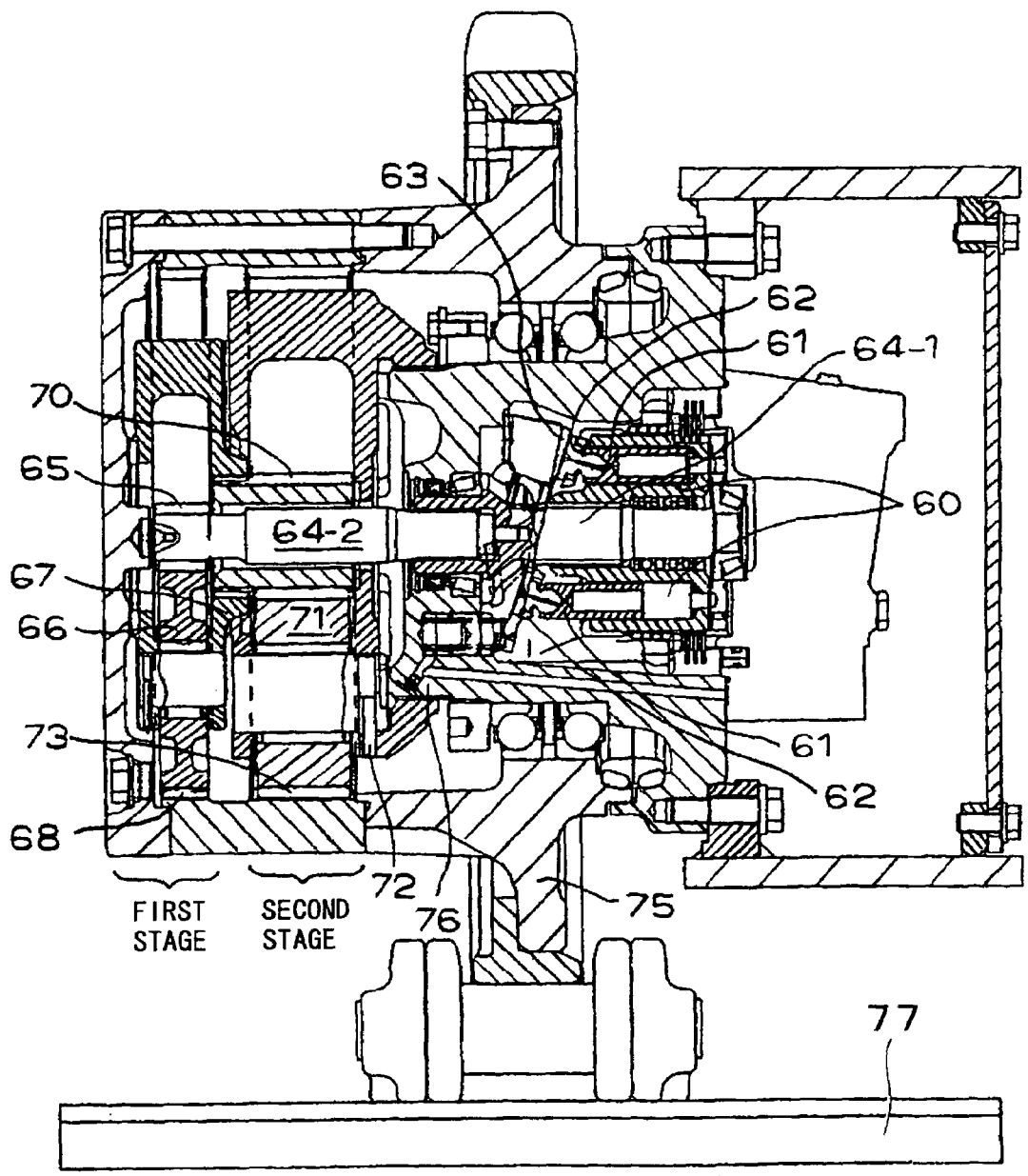
FIG. 5 is a sectional view of an axial type motor with a speed reducer in the prior art.

As an embodiment of the invention in the present application, an example applied to the radial type piston motor with the speed reducer will be explained with use of FIGS. 1 and 2. As shown in FIG. 2, in a motor case 2 of the radial type piston motor supported by a track frame 1, an eccentric cam ring 3 is supported slidably in a thrust direction (a left and right direction in FIG. 2). In FIG. 1, the eccentric cam ring 3 is slidable in an up-and-down direction which is parallel with the paper surface. A thrust receiving surface 5a formed at an inner circumference wall of the motor case 2 and a thrust receiving surface 5b provided at an opposite side from the thrust receiving surface 5a respectively support flat surfaces 6a and 6b formed at an outer circumference wall of the eccentric cam ring 3. The thrust receiving surfaces 5a and 5b, and the flat surfaces 6a and 6b are placed at symmetrical positions with respect to a center line of the eccentric cam ring 3.

A thrust bearing 7 is provided between the thrust receiving surface 5a and the flat surface 6a. The thrust bearing 7 can be also formed between the thrust receiving surface 5b and the flat surface 6b. Slide and positioning in a thrust direction (left and right direction in FIG. 2) are performed by a moving mechanism constituted of a variable piston 8 and a pressing piston 9 which are provided in the motor case 2. The moving mechanism is not limited to the above-described constitution, and a known constitution can be adopted as the moving mechanism.

An internal circumference surface of the eccentric cam ring 3 is substantially formed into a cylindrical shape. Inside this inner circumference surface, a cylinder block 10 is supported in the motor case 2, and is supported rotatably with respect to a pintle 11 provided with passages 12 and 13. A rotary shaft 20 is connected to the cylinder block 10.

A plurality of cylinders 15 each extending in a radial direction are bored in the cylinder 10. A piston 16 is slidably inserted into each of the cylinders 15, and a piston shoe 17 is pivotally joined to a tip end of the piston 16. Each of the pistons 16 and each of the piston shoes 17 overhang from the cylinder 15 extending in the radial direction, and is arrested by a holding ring (not shown) movably along the inner circumference surface of the cylindrical eccentric cam ring 3. The inner circumference surface of the eccentric cam ring 3 forms a slide surface for each of the piston shoes 17.

A rotational direction of the cylinder block 10 can be made normal or reverse by supplying the pressure oil, which is supplied to the cylinders 15 from the passage 12 or the passage 13, to the cylinders at the upper half side in FIG. 2, or to the cylinders at the lower half side. For example, if high pressure oil is supplied to the cylinders 15 at the upper half side in FIG. 2 from the longitudinal passage 12 of the pintle 11, and the return pressure oil from the cylinders 15 at the lower half side is recovered via the longitudinal passage 13, the cylinder block 10 rotates in a clockwise direction in FIG. 2.

The rotation of the cylinder block 10 is taken out by the rotary shaft 20. The rotary shaft 20 is a sun gear 21 of a first stage planetary gear train (hereinafter, called a first sun gear 21). The first stage planetary gear train is provided in a final shaft 4 constituted integrally with the motor case 2, a hollow inner circumferential surface of the final shaft 4 is formed as an internal gear 24 of the first stage planetary gear train (hereinafter, called a first internal gear 24).

In the first stage planetary gear train, a plurality of planetary gears 22 which are respectively meshed with the first sun gear 21 and the first internal gear 24 formed at the rotary shaft 20 (hereinafter, called the first planetary gears 22) are rotatably supported at a carrier 23 (hereinafter, called a first carrier 23). The first internal gear 24 is formed in the final shaft 4 constituted integrally with the motor case 2, and therefore it is in a fixed state without rotating. Consequently, the rotation of the first sun gear 21 is decelerated, and is taken out as the rotation of the first carrier 23.

A sun gear 26 in a second stage planetary gear train (hereinafter, called a second sun gear 26) is a separate body from the rotary shaft 20, is in a concentric state with the rotary shaft 20 and supported by a cover 30 of the speed reducer, and is spline-connected with the first carrier 23. Consequently, the rotation of the first carrier 23 is transmitted to the second sun gear 26.

A plurality of planetary gears 27 (hereinafter, called a second planetary gears 27), which are rotatably supported at a carrier 28 in the second stage planetary gear train (hereinafter, called a second carrier 28), are meshed with the second sun gear 26 and meshed with an internal gear 29 (hereinafter, called a second internal gear 29) formed at a traveling drive sprocket 31 supported at the final shaft 4. The second carrier 28 is fixed to the final shaft 4 and its rotation is inhibited. In the traveling drive sprocket 31 of traveling equipment 100, the cover 30 of the speed reducer is fixed at its end portion, and a sprocket 34, which is meshed with a pin 33 of the track shoe 32, is attached at an outer circumference of the traveling drive sprocket 31.

Drive of the radial type piston motor with the speed reducer of this embodiment will be explained. When pressure oil is supplied to the cylinders 15 from the passage 12 or 13 provided in the pintle 11, the pistons 16 are pressed, which presses the internal circumference surface of the eccentric cam ring 3 by the piston shoes 17 pivotally fitted to the tip ends of the pistons 16. By a reaction force from the eccentric cam ring 3 and a deviation amount of a center of rotation of the eccentric cam ring 3 and a center of rotation of a cylinder block 10, rotation moment acts on the cylinder block 10 and the cylinder block 10 rotates around the pintle 11.

The rotation of the cylinder block 10 is taken out by the rotary shaft 20, and becomes the rotation of the first sun gear 21. A plurality of first planetary gears 22 meshed with the first sun gear 21 rotates on their own axes and revolves along the first internal gear 24 of the final shaft 4 integrally fixed at the motor case 2. Revolution of the first planetary gear 22 is taken out as the rotation of the first carrier 23, and becomes the rotation of the second sun gear 26 spline-connected to the first carrier 23.

Since the second carrier 28 supporting the second planetary gears 27 is fixed to the final shaft 4, a plurality of second planetary gears 27 meshed with the second sun gear 26 are rotates on their own axes at a position at which they are supported by the second carrier 28, respectively. The rotation of the second planetary gear 27 is transmitted to the second internal gear 29 formed at the traveling drive sprocket 31, and rotates the second internal gear 29. The traveling drive sprocket 31 is rotated by the rotation of the second internal gear 29, and the track shoe 32 can be driven by the sprocket 34 provided at the traveling drive sprocket 31.

In this embodiment, the example with use of one eccentric cam ring is shown, but the eccentric cam ring is not limited to that of one row, and the radial type piston motor with use of eccentric cam rings of a plurality of rows may be applied to the present invention. As the speed reducer, the example with use of planetary gear trains of two stages is shown, but planetary gear trains of plurality of stages, which are three or more, can be disposed. On this occasion, the first several stages can be placed inside the final shaft. In this case, as the above-described second stage planetary gear train is placed outside the final shaft, at least the final stage planetary gear train needs to be placed outside the final shaft.

According to the present invention, the radial type piston motor with the speed reducer with the entire length being shortened can be provided. The radial type piston motor with the speed reducer which can be housed within a width of the track shoe can be especially provided. In addition, one or more planetary gear train or trains is or are placed inside the final shaft, whereby space efficiency of the speed reducer can be enhanced. Further, at least the final stage planetary gear train is placed outside the final shaft, whereby large torque can be generated.

What is claimed is:

1. A radial type piston motor comprising:
a motor case including a hollow final shaft integrally formed therewith; and
a speed reducer including a plurality of planetary gear trains arranged in a plurality of stages;
wherein the plurality of planetary gear trains comprises:
at least one planetary gear train corresponding to at least one said stage positioned in a hollow of said final shaft; and
at least a final stage planetary gear train positioned outside said final shaft; and
wherein a carrier in said final stage planetary gear train is fixed to said final shaft.

2. The radial type piston motor according to claim 1, wherein an inner circumference surface of the hollow of said final shaft comprises at least one internal gear of the corresponding at least one planetary gear train placed in the hollow of said final shaft.

3. The radial type piston motor according to claim 2, wherein an inner circumference surface of a traveling drive sprocket of traveling equipment comprises an internal gear of said final stage planetary gear train, and the traveling drive sprocket is rotatably supported at said final shaft.

4. The radial type piston motor according to claim 1, wherein an inner circumference surface of a traveling drive sprocket of traveling equipment comprises an internal gear of said final stage planetary gear train, and the traveling drive sprocket is rotatably supported at said final shaft.

5. A radial type piston motor comprising:
a motor case including a hollow final shaft integrally formed therewith; and
a speed reducer including a plurality of planetary gear trains arranged in a plurality of stages;
wherein the plurality of planetary gear trains comprises:
at least one planetary gear train corresponding to at least one said stage positioned in a hollow of said final shaft; and
at least a final stage planetary gear train positioned outside said final shaft; and
wherein an inner circumference surface of the hollow of said final shaft comprises at least one internal gear of the corresponding at least one planetary gear train placed in the hollow of said final shaft.

6. A radial type piston motor according to claim 5, wherein an inner circumference surface of a traveling drive sprocket of traveling equipment comprises an internal gear of said final stage planetary gear train, and the traveling drive sprocket is rotatably supported at said final shaft.

7. A radial type piston motor comprising:
a motor case including a hollow final shaft integrally formed therewith; and
a speed reducer including a plurality of planetary gear trains arranged in a plurality of stages;
wherein the plurality of planetary gear trains comprises:
at least one planetary gear train corresponding to at least one said stage positioned in a hollow of said final shaft; and
at least a final stage planetary gear train positioned outside said final shaft; and
wherein an inner circumference surface of a traveling drive sprocket of traveling equipment comprises an internal gear of said final stage planetary gear train, and the traveling drive sprocket is rotatably supported at said final shaft.

* * * * *